Patented Dec. 18, 1934

1,984,885

UNITED STATES PATENT OFFICE 1,984,885

1-AMINO-ARYLENE THIAZOLES AND THEIR PRODUCTION

Herbert August Lubs and John Elton Cole, Wilmington, Del., assignors to E. I. du Pont de Nemours & Company, Wilmington, Del., a corporation of Delaware No Drawing. Application March 23, 1931, Serial No. 524,757

6 Claims. (Cl. 260—44)

This invention relates to the manufacture of chlorinated aryl-thiazoles. More particularly it relates to the preparation of chlorinated aryl-thiazoles having the formula

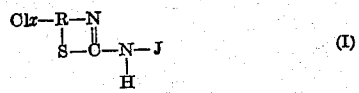

in which R represents an aryl radical which may contain substituents, for example, halogen, alkyl and alkoxy, J represents hydrogen, an alkyl radical or an aryl radical which may contain substituents for example halogen, alkyl and alkoxy and x represents an integer, from thioureas having the formula

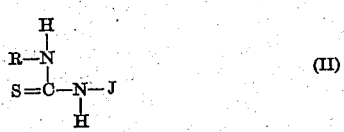

and which have one position of the radical R adjacent the —NH group unsubstituted, or from aryl-thiazoles having the formula

This invention has for an object the economical manufacture of halogenated aryl-thiazoles. Other objects are the production of new chemical compounds, of new chemical processes and in general an advancement of the art.

These objects are accomplished by treating compounds having the general formula (II) or (III) above with chlorinating agents.

The invention will be further understood from a consideration of the following specific examples in which the parts are given by weight.

Example I

Thirty-two (32) parts of unsymmetrical ortho-tolyl thiourea were suspended in 180 parts of nitro-benzene, the mixture cooled with good agitation to 8° C. and a slow stream of chlorine passed into the mixture. The reaction temperature was maintained at 20° C. or lower by exterior cooling. The thiourea dissolved to a clear brownish yellow solution. After about one hour precipitation began and hydrochloric acid gas was evolved from the reaction mass. When a test portion showed that the precipitated amino-thiazole hydrochloride when converted to the free amino thiazole melted at 200° C. the white precipitate was removed by filtration, washed with benzene and dried. This product was dissolved in hot water and the solution clarified by filtration. When ammonia was added to this solution a white precipitate formed which was thereafter dried. This compound was 1-amino-3-methyl-5-chloro-benzo-thiazole as proved by direct comparison with the amino-thiazole known to have this structure.

Example II

Three hundred (300) parts of phenyl thiourea were suspended in 600 parts of glacial acetic acid and the mixture cooled. Chlorine was then passed in slowly while the temperature was maintained below 20° C. When a test portion gave an amino-benzo-thiazole melting above 190° C. the chlorination was stopped and the product which consisted of the hydrochloride of 1-amino-5-chlor-benzo-thiazole was removed by filtration and washed with a small amount of acetic acid. This product was dissolved in hot water and precipitated as the free amino-thiazole with ammonia. The product obtained melted at 195–6° C.

Example III

Forty-five (45) parts of phenyl thiourea were suspended in 137 parts of nitro-benzene. Chlorine was slowly passed into this mixture while maintaining the temperature below 20° C. until a test sample showed complete chlorination as in the previous example. The precipitate was removed by filtration and washed with a small amount of benzene. This crude product was agitated with 50 parts of hydrochloric acid (Sp. G. 1.12) with warming until a test portion when diluted with water gave no coloration. The whole was then diluted to 500 parts and filtered while hot. When excess ammonia was added to the filtrate 1-amino-5-chlor-benzo-thiazole separated and it was then filtered and dried.

Example IV

Thirty (30) parts of phenetyl-thiourea were suspended in 150 parts of ethylene dichloride and with the temperature maintained below 20° C. chlorine was passed in until the melting point of two successive samples of the isolated product were identical. This product was then removed by filtration, washed with fresh ethylene dichloride and dried. The product was stirred with excess ammonia, filtered, washed and dried. It was practically pure 1-amino-3:4:6-trichlor-5-ethoxy-benzo-thiazole. This new compound is readily soluble in hot ethyl alcohol from which it can be easily recrystallized. When purified from alcohol it melted at 274–276° C.

Example V

Thirty (30) parts of phenetyl-thiourea were suspended in 170 parts of nitro-benzene and chlorine passed in with the temperature below 20° C. The product was isolated in a manner similar to the previous examples. It was 1-amino-5-ethoxy-chlor-benzo-thiazole.

Example VI

Chlorine was passed into a cold nitro-benzene suspension of para-chloro-phenyl phenyl-thiourea having the probable formula

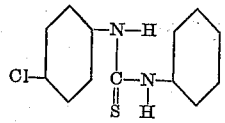

The chlorinated product produced was removed by filtration and shown to be 1-ortho-para-dichloro-anilido-benzo-thiazole having the probable formula

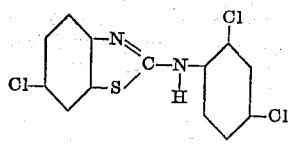

Example VII

One (1) part of ortho-tolyl-thiourea was suspended in four parts of liquid sulphur dioxide in an iron vessel and while maintaining the temperature at about −30° C. chlorine was passed in slowly. When a test indicated that the chlorination was complete the sulphur dioxide was allowed to evaporate. The residual mass containing some sulphuryl chloride ($SO_2Cl_2$) was diluted with water and treated with ammonia. The precipitate was removed by filtration, washed and dried. It was shown by analysis to be 1-amino-3-methyl-dichloro-benzo-thiazole.

Example VIII

One (1) part of unsymmetrical alpha-naphthyl-thiourea was suspended in 4 parts of nitro-benzene and chlorine passed in slowly while maintaining the temperature below 20° C. The product which separated was removed by filtration and dissolved in hot dilute hydrochloric acid. When ammonia was added to the clarified solution a precipitate of chlorinated amino-naphthyl-thiazole containing one chlorine atom in the aryl nucleus was produced.

Example IX

One hundred (100) parts of 1-ortho-toluidino-3-methyl benzo-thiazole were suspended in 400 parts of nitro-benzene and 150 parts of sulphuryl chloride added to the well agitated mass. The solution was warmed for a few minutes at 60° C., cooled and filtered. The precipitate was washed with benzene to remove the nitro-benzene. The product consisted of the hydrochloride of 1-para-chloro-ortho-toluidino-3-methyl-5-chlor-benzo-thiazole. The free base was obtained from this compound by agitation with excess ammonia.

Example X

Fifty (50) parts of di-ortho-tolyl-thiourea were suspended in 150 parts of commercial ortho-di-chloro-benzene. This mixture was well cooled and chlorine was passed in with good agitation. During the first vigorous reaction the chlorine was passed in at such speed as to keep the temperature of the reactions below 20° C. The thiourea dissolved and after a short time a precipitate began to form. The chlorine was then allowed to pass in slowly for eight hours more at ordinary temperature. The product was then removed by filtration and identified by the melting point of the free base. The compound produced was 1-para-chloro-ortho-toluidino-3-methyl-5-chlor-benzo-thiazole.

Example XI

One (1) part of thio-carbanilide was suspended in 3 parts of nitro-benzene. Chlorine was passed into the cooled suspension for 10 hours (until a test showed that the product was fully chlorinated). The product was removed by filtration. It was shown to be 1-ortho-para-dichloro-anilido-5-chloro-benzo-thiazole.

Example XII

By a procedure similar to Example VIII unsymmetrical beta-naphthyl-thiourea was converted to a chlorinated amino-naphthyl-thiazole containing two chlorine atoms in the aryl nucleus.

As will be clear from the above examples this invention is applicable to a wide range of starting compounds. It is especially applicable to the preparation of chlorinated amino-aryl-thiazoles and very desirable results have been obtained in the preparation of amino-benzo-thiazoles having the formula

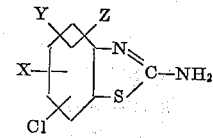

in which X, Y and Z represent members of the group consisting of hydrogen, halogen, alkyl and alkoxy. In the preparation of these particular compounds the thioureas having the formula

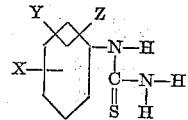

and the benzo-thiazoles having the formula

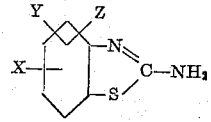

are used as starting materials.

A wide range of suspension agents may be used for example, nitro-benzene, nitro-toluene, acetic acid, ethylene di-chloride, sulphur dioxide and chloro-benzenes. Other solvents and/or suspension agents will be obvious to those skilled in the art. In certain instances it is possible to eliminate the use of a suspension agent or solvent by using an excess of the chlorinating agent. Since some of the starting compounds exhibit some solubility in some of the suspension media, it is intended that the term "suspension" as used in the specification and claims, be generic to, and cover the mixture of starting compound and the suspension medium whether a solution exists or not. When it is intended to cover either type of suspension medium to the exclusion of the other, its full description is included.

Pressure may be used to an advantage in the invention above described since it increases the solubility of the reacting gases in the solvents or suspension agents selected.

In the above description use has been made of the following type of formula

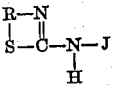

It is realized, however, that these compounds may exist in the tautomeric form having the formula

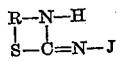

For this reason, wherever the first mentioned formulae are used in the specification and claims, it is intended to cover the compound regardless of the tautomeric form in which it actually exists.

The compounds above described are valuable as intermediates in the manufacture of dyestuffs.

As many apparently widely different embodiments of this invention may be made without departing from the spirit and scope thereof, it is to be understood that we do not limit ourselves to the specific embodiments thereof except as defined in the appended claims.

We claim:

1. The process which comprises treating a suspension of a compound having the formula

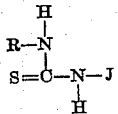

in which R represents an aryl radical of the benzene or naphthalene series, J represents hydrogen, an alkyl radical or an aryl radical of the benzene series, and which has one position of the radical R adjacent the —NH group unsubstituted, with a chlorinating agent until the radical R is chlorinated.

2. The process of producing a compound having the formula

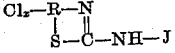

wherein R represents a phenyl or naphthyl radical; J represents hydrogen, an alkyl radical, or a phenyl radical of the group consisting of benzene, homologs of benzene, halogen substitution products of benzene and alkoxy substitution products of benzene; and $x$ is an integer not greater than 4, which comprises treating a suspension of a compound of the formula

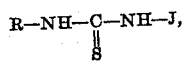

wherein R and J have the same significance as above, with a chlorinating agent until the radical R is chlorinated.

3. The process which comprises suspending unsymmetrical ortho-tolyl-thiourea in nitro-benzene, passing chlorine into the suspension until the tolyl group is chlorinated, and isolating the 1-amino-3-methyl-5-chloro-benzo-thiazole.

4. The compound having the following formula

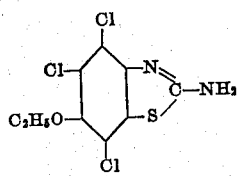

which is a white solid readily soluble in hot ethyl alcohol and melts at 274–6° C.

5. The process which comprises treating a suspension of a compound having the formula

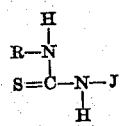

in which R represents an aryl radical of the benzene or naphthalene series, J represents hydrogen, an alkyl radical, or an aryl radical of the benzene series, and which has one position of the radical R adjacent the —NH group unsubstituted, with a chlorinating agent and a chlorination catalyst until the radical R is chlorinated.

6. The process which comprises treating a suspension of a compound having the formula

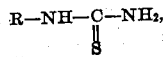

wherein R is an aryl radical of the benzene series having at least one position adjacent the —NH group unsubstituted, with a chlorinating agent and a chlorination catalyst until a test sample shows the formation of a nuclearly chlorinated corresponding benzothiazole.

HERBERT A. LUBS.
JOHN ELTON COLE.